United States Patent [19]
Stephenson, III et al.

[11] Patent Number: 5,598,238
[45] Date of Patent: Jan. 28, 1997

[54] CAMERA WITH FRONT FLIP-UP FLASH UNIT AND REAR FLIP-UP FLASH RETAINER HAVING FRONT AND REAR VIEWFINDER OPENINGS

[75] Inventors: Stanley W. Stephenson, III, Spencerport; Alan G. Codd, Jr., Rochester, both of N.Y.

[73] Assignee: Eastman Kodak Company, Rochester, N.Y.

[21] Appl. No.: 584,479

[22] Filed: Jan. 11, 1996

[51] Int. Cl.⁶ .................... G03B 15/03; G03B 17/02
[52] U.S. Cl. .................... 396/178; 396/348; 396/373
[58] Field of Search .................... 354/126, 149.1, 354/149.11, 187, 219, 288

[56] References Cited

U.S. PATENT DOCUMENTS

| | | | |
|---|---|---|---|
| 1,114,895 | 10/1914 | Linder | 354/219 |
| 2,143,385 | 1/1939 | Platt | 354/187 |
| 4,996,548 | 2/1991 | Schappler et al. | 354/149.11 |
| 5,005,032 | 4/1991 | Burnham | 354/149.11 |
| 5,436,686 | 7/1995 | Walsh | 354/288 |

Primary Examiner—David M. Gray
Assistant Examiner—J. K. Han
Attorney, Agent, or Firm—Roger A. Fields

[57] ABSTRACT

A camera is provided with a front flip-up flash unit and a rear flip-up flash retainer having front and rear viewfinder openings that are aligned to view a subject to be photographed when the flash unit and the flash retainer are flipped up. If the flash unit is folded down for storage, the flash retainer is folded over the flash unit to secure the flash unit in place.

6 Claims, 2 Drawing Sheets

CAMERA WITH FRONT FLIP-UP FLASH UNIT AND REAR FLIP-UP FLASH RETAINER HAVING FRONT AND REAR VIEWFINDER OPENINGS

FIELD OF THE INVENTION

The invention relates generally to the field of photography, and in particular to cameras with a flip-up flash unit and an integrated open-air viewfinder.

BACKGROUND OF THE INVENTION

It is known for a camera to be provided with a flip-up electronic flash unit and an integrated open-air viewfinder. For example, U.S. Pat. No. 4,996,548, issued Feb. 26, 1991, and No. 5,005,032, issued Apr. 2, 1991, each disclose a camera comprising a body portion, an electronic flash unit having a front viewfinder opening and supported to be flipped up from the body portion for picture-taking and to be flipped down to the body portion for storage, and a cover part having a rear viewfinder opening and supported to be flipped up from the body portion to align its rear viewfinder opening with the front viewfinder opening of the flash unit when the flash unit is flipped up for picture-taking and to be flipped down partly over the flash unit when the flash unit is flipped down for storage. A torsion spring urges the cover part to follow the flash unit in the same direction when the flash unit is flipped down into a front recess in the body portion.

SUMMARY OF THE INVENTION

According to the invention a camera comprising a body portion, a flash unit having a front viewfinder opening and supported to be flipped up from the body portion for picture-taking and to be flipped down to the body portion for storage, and a cover part having a rear viewfinder opening and supported to be flipped up from the body portion to align the rear viewfinder opening with the front viewfinder opening when the flash unit is flipped up for picture-taking and to be flipped down partly over the flash unit when the flash unit is flipped down for storage, is characterized in that:

the flash unit and the cover part are supported to be flipped down independently of one another, in opposite directions, to permit the flash unit to be flipped down first for storage and the cover part to be flipped down second to partly cover the flash unit.

Preferably, the flash unit is supported to be flipped down in a rearward direction with respect to the body portion, and the cover part is supported to be flipped down over the flash unit in a forward direction with respect to the body portion. The body portion has a top rearward cavity for storing the flash unit when the flash unit is flipped down. This design is especially useful because the flash unit has a plurality of flash illumination sources (as compared to one illumination source) and, therefore is relatively large.

Also, the flash unit and the cover part include mutually engageable means for engaging when the flash unit and the cover part are each flipped down.

DETAILED DESCRIPTION OF THE INVENTION

The invention is disclosed as being embodied preferably in a camera with a flip-up flash unit and an integrated open-air viewfinder. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
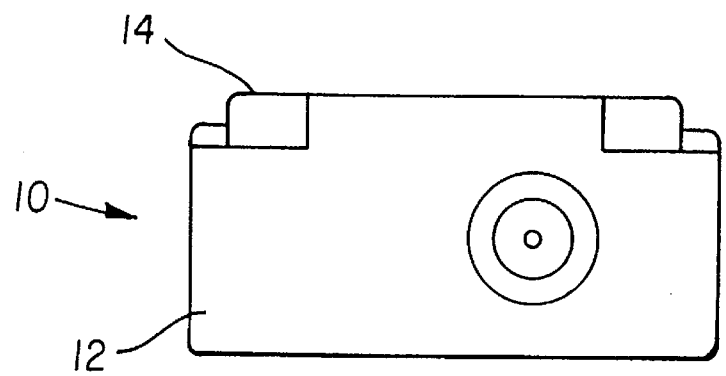
FIG. 1 is a is a front elevation view of the camera according to a preferred embodiment of the invention, showing the flash unit and the cover part flipped down for storage.
Figure 2:
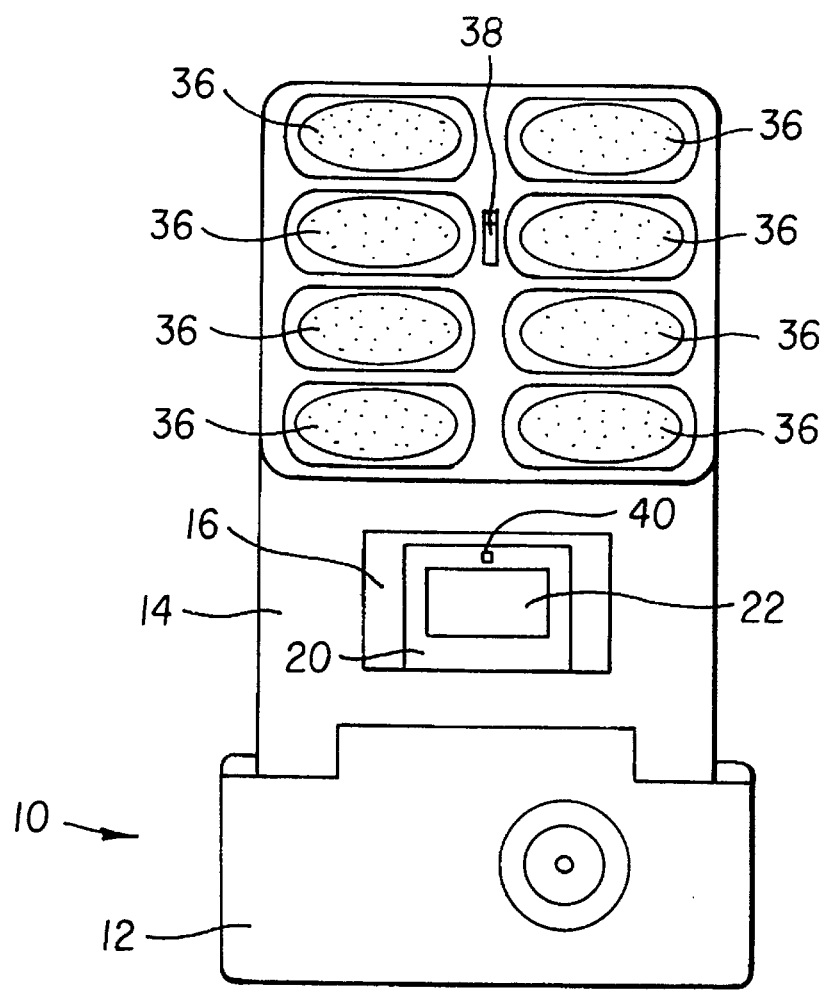
FIG. 2 is a is a front elevation view of the camera, showing the flash unit and the cover part flipped up for picture-taking.
Figure 3:
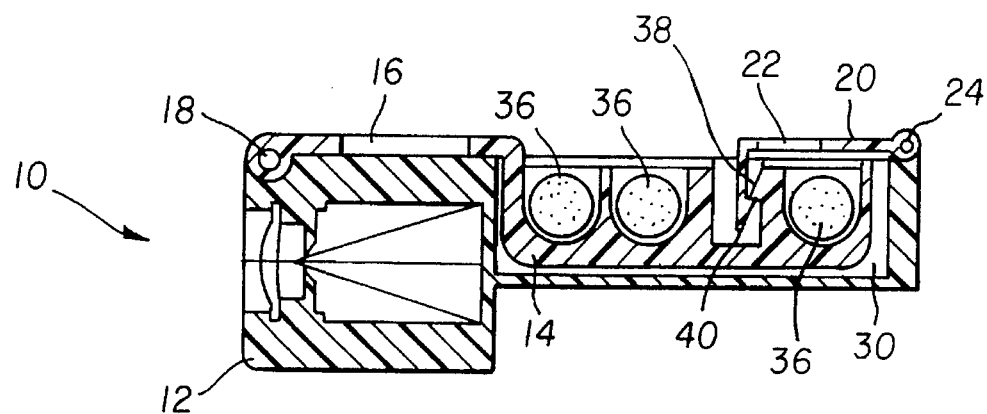
FIG. 3 is a side sectional view of the camera as shown in FIG. 1.
Figure 4:
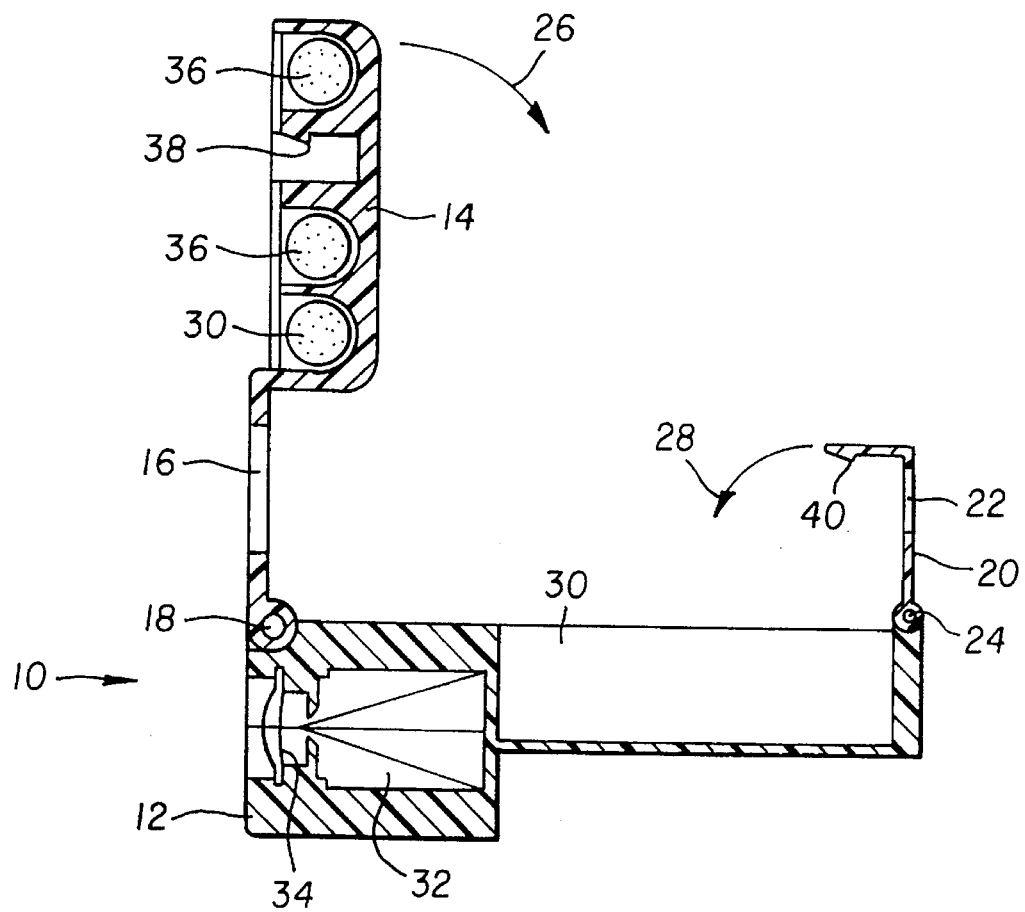
FIG. 4 is a is a side sectional view of the camera as shown in FIG. 2.

Referring now to the drawings, FIGS. 1–4 show a camera 10 comprising a body portion 12, a flash unit 14 having a front viewfinder opening 16 and supported at a front pivot pin 18 to be manually flipped up from the body portion for picture-taking and to be flipped down to the body portion for storage, and a cover part 20 having a rear viewfinder opening 22 and supported at a rear pivot pin 24 to be manually flipped up from the body portion to align its rear viewfinder opening with the front viewfinder opening of the flash unit when the flash unit is flipped up for picture-taking and to be flipped down partly over the flash unit when the flash unit is flipped down for storage.

The flash unit 14 and the cover part 20 are adapted to be manually flipped down independently of one another, in rearward and forward opposite directions 26 and 28 with respect to the body portion 12, to permit the flash unit to be flipped down first for storage and the cover part to be flipped down second to partly cover the flash unit. See FIGS. 3 and 4.

The body portion 12 has a top rearward cavity 30 for storing the flash unit 14 when the flash unit is flipped down. See FIGS. 3 and 4. The cavity 30 longitudinally extends behind a film exposure chamber 32 which is behind a lens-shutter-shutter unit 34 inside the body portion 12. This design is especially useful because the flash unit 14 has a plurality of flash illumination sources in the form of eight built-in flash bulbs 36 and, therefore is relatively large as compared to an electronic flash unit such as shown in prior art U.S. Pat. No. 4,996,548.

The flash unit 14 and the cover part 20 include mutually engageable means namely a catch 38 on the flash unit and a flexible hook 40 on the cover part, for releasably engaging when the flash unit and the cover part are each flipped down.

Although not shown, relatively light torsion springs can be provided for holding the flash unit 14 and the cover part 20 flipped up. Alternatively, respective detents can be provided for the same purpose.

The invention has been described with reference to a preferred embodiment. However, it will be appreciated that variations and modifications can be effected by a person of ordinary skill in the art without departing from the scope of the invention.

PARTS LIST 10. camera
12. body portion
14. flash unit 16. front viewfinder opening
18. front pivot pin
20. cover part
22. rear viewfinder opening
24. rear pivot pin
26. rearward direction
28. forward direction
30. cavity
32. film exposure chamber
34. lens-shutter unit
36. flash bulbs
38. catch
40. hook

We claim:

1. A camera comprising a body portion, a flash unit having a front viewfinder opening and supported to be flipped up from said body portion for picture-taking and to be flipped down to the body portion for storage, and a cover part having a rear viewfinder opening and supported to be flipped up from said body portion to align said rear viewfinder opening with said front viewfinder opening when said flash unit is flipped up for picture-taking and to be flipped down partly over the flash unit when the flash unit is flipped down for storage, is characterized in that:

said flash unit and said cover part are supported to be flipped down independently of one another, in opposite directions, to permit the flash unit to be flipped down first for storage and the cover part to be flipped down second to partly cover the flash unit.

2. A camera as recited in claim 1, wherein said flash unit is supported to be flipped down in a rearward direction with respect to said body portion, and said cover part is supported to be flipped down over said flash unit in a forward direction with respect to said body portion.

3. A camera as recited in claim 2, wherein said body portion has a top rearward cavity for storing said flash unit when the flash unit is flipped down.

4. A camera as recited in claim 3, wherein said body portion has an internal film exposure chamber, and said cavity longitudinally extends behind said chamber.

5. A camera as recited in claim 3, wherein said flash unit has a plurality of flash illumination sources.

6. A camera as recited in claim 1, wherein said flash unit and said cover part include mutually engageable means for engaging when the flash unit and the cover part are each flipped down.

* * * * *